US009847082B2

(12) United States Patent
Mohideen et al.

(10) Patent No.: US 9,847,082 B2
(45) Date of Patent: Dec. 19, 2017

(54) SYSTEM FOR MODIFYING SPEECH RECOGNITION AND BEAMFORMING USING A DEPTH IMAGE

(71) Applicant: Honeywell International Inc., Morristown, NJ (US)

(72) Inventors: Mohammed Ibrahim Mohideen, Karnataka (IN); Yadhunandan Us, Andhra Pradesh (IN)

(73) Assignee: Honeywell International Inc., Morris Plains, NJ (US)

( * ) Notice: Subject to any disclaimer, the term of this patent is extended or adjusted under 35 U.S.C. 154(b) by 505 days.

(21) Appl. No.: 13/974,399

(22) Filed: Aug. 23, 2013

(65) Prior Publication Data

US 2015/0058003 A1 Feb. 26, 2015

(51) Int. Cl.
*G10L 15/20* (2006.01)
*G10L 15/22* (2006.01)
*G10L 21/0216* (2013.01)

(52) U.S. Cl.
CPC ........ *G10L 15/20* (2013.01); *G10L 2015/226* (2013.01); *G10L 2015/227* (2013.01); *G10L 2021/02166* (2013.01)

(58) Field of Classification Search
CPC .............. G10L 15/07; G10L 2015/226; G10L 2015/228; G10L 15/25; G10L 2021/02166; G10L 15/20; G06K 9/00201; G06T 7/0075
USPC .................. 704/226, 236, 270, 275; 382/154
See application file for complete search history.

(56) References Cited

U.S. PATENT DOCUMENTS

| 6,243,683 B1 | 6/2001 | Peters |
| 6,449,593 B1 * | 9/2002 | Valve ............................ 704/233 |
| 7,031,917 B2 | 4/2006 | Asano |
| 8,160,270 B2 * | 4/2012 | Oh ......................... H04R 1/406 381/92 |

(Continued)

FOREIGN PATENT DOCUMENTS

| EP | 2428951 A2 | 3/2012 |
| EP | 2690886 A1 | 1/2014 |

(Continued)

OTHER PUBLICATIONS

Kumatani, Kenichi, et al. "Microphone array processing for distant speech recognition: Towards real-world deployment." Proc. APSIPA ASC, Hollywood, CA, Dec. 2012, pp. 1-10.*

(Continued)

*Primary Examiner* — James Wozniak
(74) *Attorney, Agent, or Firm* — Schwegman Lundberg & Woessner, P.A.

(57) ABSTRACT

A system includes a speech recognition processor, a depth sensor coupled to the speech recognition processor, and an array of microphones coupled to the speech recognition processor. The depth sensor is operable to calculate a distance and a direction from the array of microphones to a source of audio data. The speech recognition processor is operable to select an acoustic model as a function of the distance and the direction from the array of microphones to the source of audio data. The speech recognition processor is operable to apply the distance measure in the microphone array beam formation so as to boost portions of the signals originating from the source of audio data and to suppress portions of the signals resulting from noise.

16 Claims, 4 Drawing Sheets

(56) References Cited

U.S. PATENT DOCUMENTS

| | | | |
|---|---|---|---|
| 9,236,050 B2* | 1/2016 | DiGregorio | G10L 15/20 |
| 2004/0054531 A1* | 3/2004 | Asano | G10L 15/20 |
| | | | 704/231 |
| 2005/0216274 A1* | 9/2005 | Kim | 704/276 |
| 2009/0167923 A1* | 7/2009 | Safaee-Rad et al. | 348/345 |
| 2010/0026780 A1* | 2/2010 | Tico | G06T 7/2033 |
| | | | 348/14.02 |
| 2010/0315905 A1* | 12/2010 | Lee et al. | 367/127 |
| 2011/0091055 A1* | 4/2011 | LeBlanc | H04S 7/301 |
| | | | 381/303 |
| 2011/0184735 A1* | 7/2011 | Flaks et al. | 704/240 |
| 2011/0199372 A1* | 8/2011 | Porter | G06T 7/2046 |
| | | | 345/419 |
| 2011/0257971 A1 | 10/2011 | Morrison | |
| 2011/0261160 A1* | 10/2011 | Tadokoro | H04N 13/0011 |
| | | | 348/46 |
| 2011/0313768 A1* | 12/2011 | Klein et al. | 704/251 |
| 2012/0099829 A1* | 4/2012 | Moberg | H03G 3/3089 |
| | | | 386/200 |
| 2013/0050426 A1* | 2/2013 | Sarmast | G01S 17/89 |
| | | | 348/46 |
| 2013/0321404 A1* | 12/2013 | Chou | G06F 3/0304 |
| | | | 345/419 |
| 2013/0339027 A1* | 12/2013 | Dokor et al. | 704/275 |
| 2014/0277735 A1* | 9/2014 | Breazeal | 700/259 |
| 2014/0337016 A1* | 11/2014 | Herbig et al. | 704/201 |
| 2014/0362253 A1* | 12/2014 | Kim et al. | 348/231.4 |
| 2015/0123890 A1* | 5/2015 | Kapur | G06F 3/0304 |
| | | | 345/156 |
| 2015/0296319 A1* | 10/2015 | Shenoy | H04S 7/302 |
| | | | 381/303 |
| 2016/0105636 A1* | 4/2016 | Guo | H04N 19/597 |
| | | | 348/14.15 |

FOREIGN PATENT DOCUMENTS

| | | |
|---|---|---|
| WO | WO-2013/058728 A1 | 4/2013 |
| WO | WO-2014182976 A1 | 11/2014 |

OTHER PUBLICATIONS

Onuma, Yuji, et al. "Real-time semi-blind speech extraction with speaker direction tracking on Kinect." Signal & Information Processing Association Annual Summit and Conference (APSIPA ASC), Dec. 2012, pp. 1-6.*

"United Kingdom Application Serial No. 1414086.7, Response filed Aug. 21, 2015 to Examination Report dated Jan. 14, 2015", 4 pgs.

"United Kingdom Application Serial No. 1414086.7, Combined Examination and Search Report dated Jan. 14, 2015", 6 pgs.

"United Kingdom Application Serial No. 1414086.7, Response filed Nov. 7, 2016 to Office Action dated Oct. 5, 2016", 12 pgs.

"United Kingdom Application Serial No. 1414086.7, Office Action dated Oct. 5, 2016", 3 pgs.

* cited by examiner

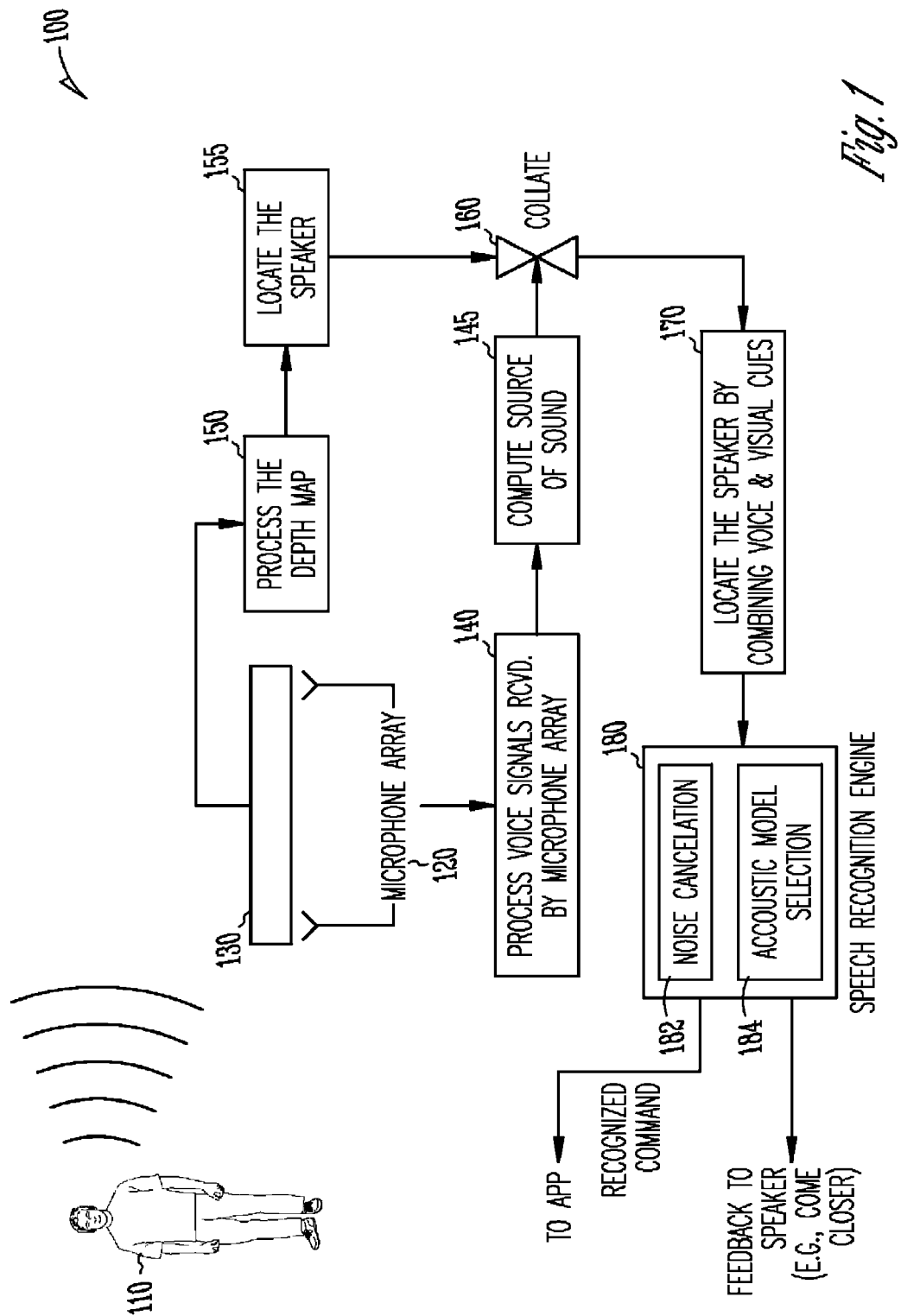

SYSTEM FOR MODIFYING SPEECH RECOGNITION AND BEAMFORMING USING A DEPTH IMAGE

TECHNICAL FIELD

The current disclosure relates to a speech recognition system, and in an embodiment, but not by way of limitation, a speech recognition system that uses distance, direction, and acoustic models to boost a desired portion of an audio signal and suppress a noise portion of the audio signal.

BACKGROUND

Voice and motion controlled products are increasing in popularity by the day in gaming, residential, and industrial applications. For example, the introduction of the Kinect® device has redefined gaming applications, and its adoption for non-gaming uses continues to grow. A good voice-based control system needs a good speech recognition module. The performance of an Automatic Speech Recognition (ASR) engine or processor depends on several factors such as background noise, distance between the speaker and the engine, and the quality of the microphone, just to name a few.

BRIEF DESCRIPTION OF THE DRAWINGS

FIG. 1 is a block diagram of a speech recognition system.

DETAILED DESCRIPTION

Figure 2A:
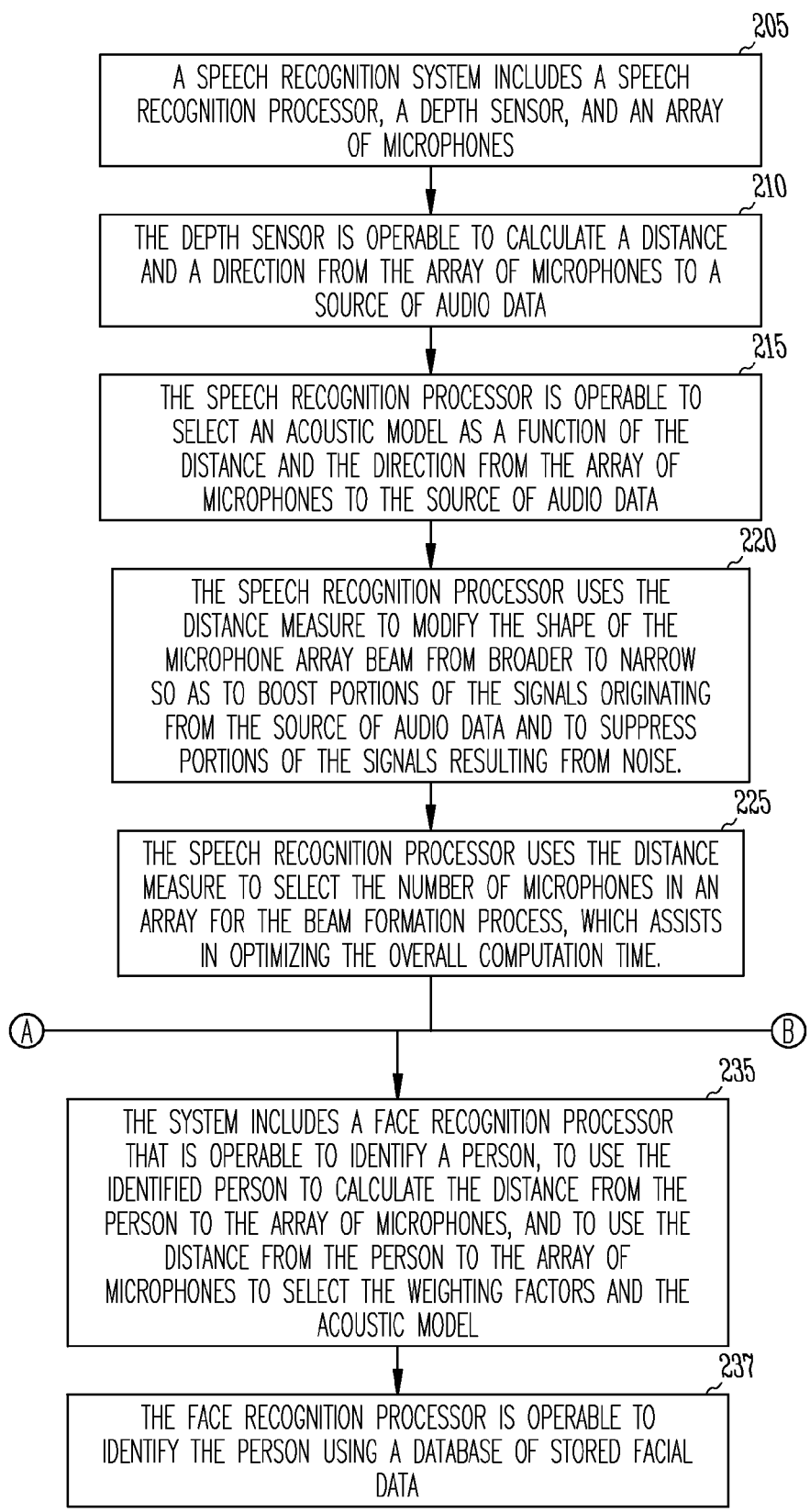
FIGS. 2A, 2B, 2C, and 2D are a block diagram illustrating features and operations of a speech recognition system.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Knowing a speaker's location in an Automatic Speech Recognition (ASR) system can be important for several reasons. First, it can be important for effective noise cancellation. Even though many noise cancellation methods are known, they all have their own limitations. One of the most prominent approaches is to deploy an array of microphones. The array of microphones achieves good noise cancellation by beam forming. Beam forming algorithmically steers the sensors toward a target signal, thus separating speech and noise. A limitation of beam forming is that if the speech and the noise are coming from the same direction and/or angle, then noise cancellation fails.

Second, there is the issue of location independent speech recognition. In most ASR systems, high recognition accuracy can be achieved for speech uttered at a location closer to a microphone. However, as distance increases, the amplitude of the received speech signal decays, thereby affecting recognition accuracy.

In some speech recognition systems, additional sensors (e.g., stereo cameras) have been deployed to measure the distance to a speaker and use the distance as feedback for improving the performance of a speech recognition processor. However, this leads to additional cost and infrastructure. The devices that are capable of performing voice and motion controlled actions, such as Kinect®, on the other hand, have an integrated depth camera along with a microphone array. However, the capability of a depth camera to locate the speaker is not utilized by the microphone array to suppress noise.

In an embodiment, a solution uses the co-presence of a depth sensor such as a depth camera and a microphone array for improved speech recognition performance. It enhances the performance of voice controlled applications that have a 3D depth sensor integrated with a microphone array, such as the Kinect® system, by taking data from a depth camera and an associated microphone array, interpreting that data, and providing that interpretation to a speech recognition processor or engine. Specifically, a scene depth map is computed by the camera. The scene depth map is then subjected to image segmentation to separate the speaker from the background, and to determine the speaker's distance to the device (for example, a gaming system or a home control system). The depth information is fed to the speech recognition engine and the engine selects a distance specific acoustic model. The model applies weighting factors to the signals received by the different units of the microphone array, thereby suppressing the noise and boosting the signal amplitude of the speaker's voice. Under this scenario, when a command uttered by the speaker is not recognized, an appropriate feedback such as "come closer" or "speak louder" can be offered to the speaker with computed information on distance. In an another embodiment, if the measured distance between the speaking person and the microphone array is beyond a preset value that ASR is not known for reliable performance, such feedback is offered to user.

FIG. 1 is a block diagram of a speech recognition system 100. The system 100 is operable to receive speech from a person 110. The speech is sensed by an array of microphones 120. The microphone array 120 does not include any mechanical arrangement device. Rather, the microphone array 120 simply contains spatially separated microphone components that receive voice signals (direct or multi-path) at different instances of time. A three-dimensional sensor 130 is configured to determine a distance from the sensor 130 to the speaker 110. The microphone array 120 processes the voice signals received from the speaker 110 at 140, and determines a direction from the microphone array 120 to the speaker 110 at 145. The 3D sensor 130 generates and processes a depth map at 150, and determines a distance from the sensor 130 to the speaker 110 at 155. A collating processor 160 receives and processes the data from the microphone array 120 and the 3D sensor 130, and at 170, locates the speaker based on this data (voice and visual cues). Speech recognition engine 180 further selects an acoustic model 184 based on the distance between the person 110 and the microphone array 120. The speech recognition engine 180 cancels any noise that was received by the microphone array 120 using noise cancellation module 182. The speech recognition engine further recognizes the voice command, and executes a function on the system based on the voice command. The speech recognition engine 180 can also provide instructional output to the speaker 110. The system of FIG. 1 can therefore use the distance to the speaker to improve to a great extent the performance of an ASR system. Specifically, in an embodiment, using the distance and direction improves noise suppression. And as noted elsewhere, the distance can be used to modify the beam formation wherein the shape of the beam is altered.

Figure 2B:
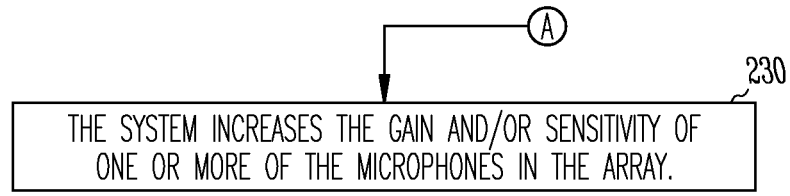
Figure 2C:
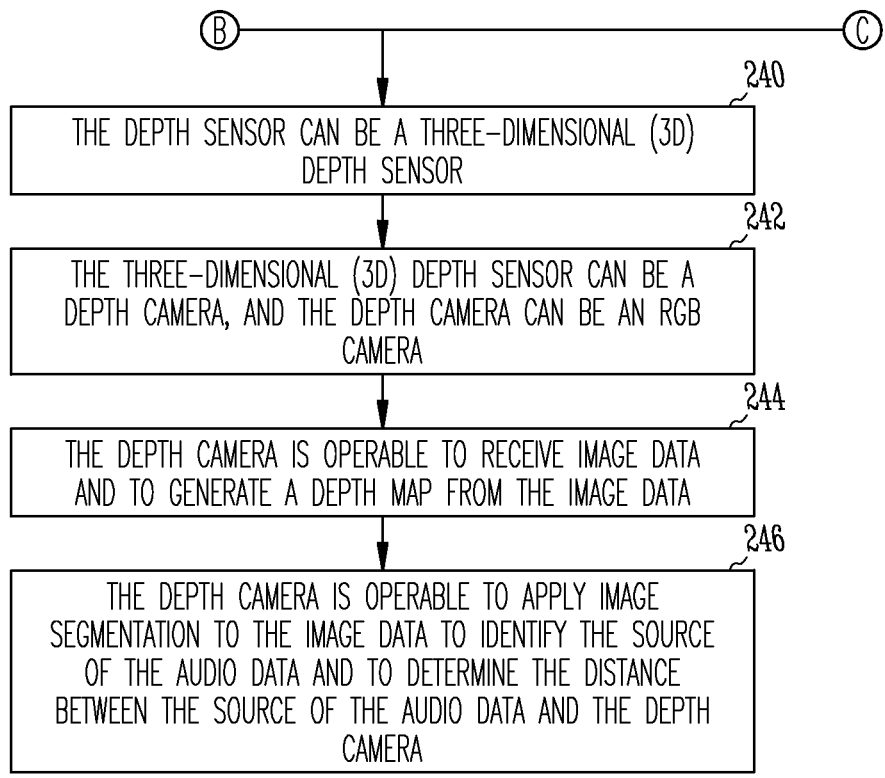
Figure 2D:
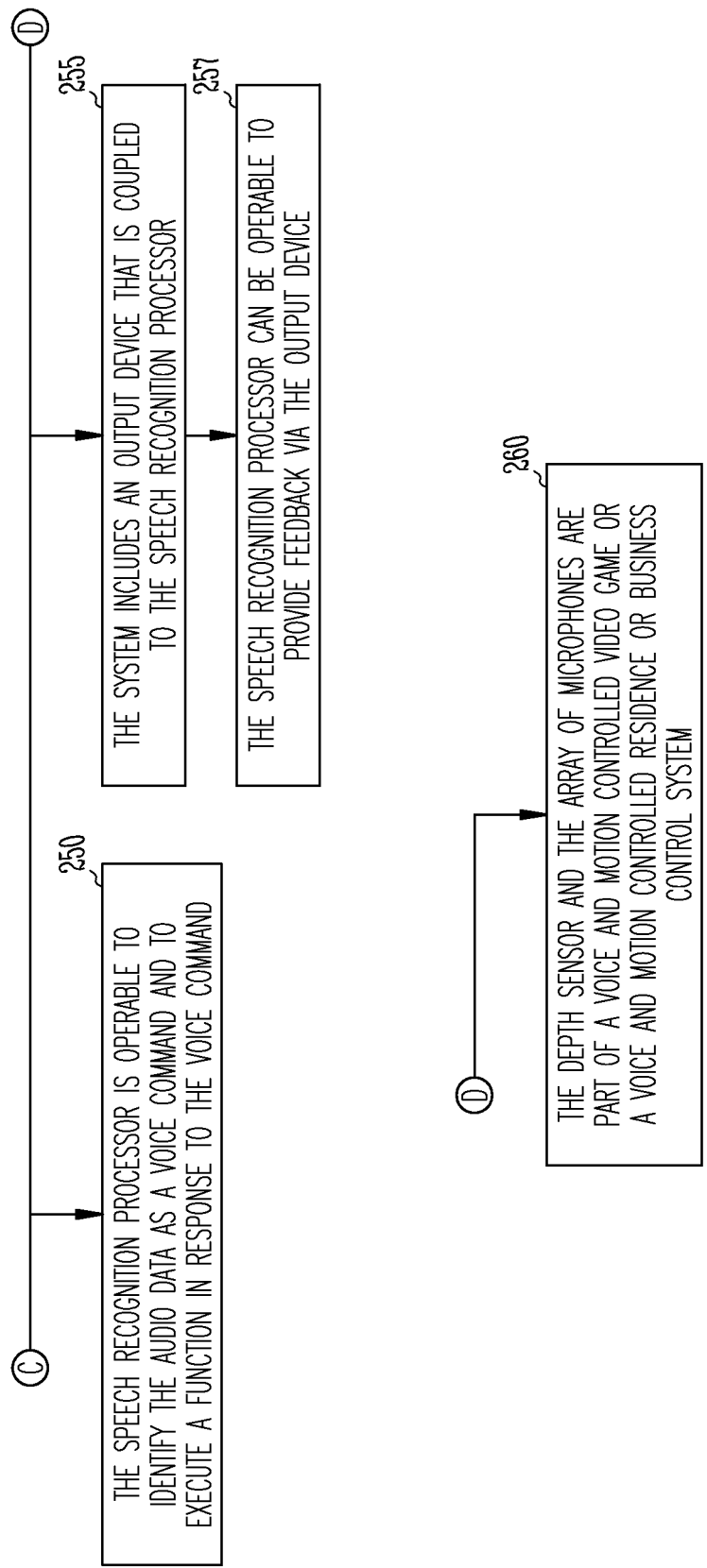

FIGS. 2A, 2B, 2C, and 2D are a block diagram illustrating operations and features of an example speech recognition system and process. FIGS. 2A, 2B, 2C, and 2D include a number of operation and process blocks 205-260. Though arranged serially in the example of FIGS. 2A, 2B, 2C, and 2D, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now to FIGS. 2A, 2B, 2C, and 2D, at 205, a speech recognition system is provided. The system includes a speech recognition processor, a depth sensor coupled to the speech recognition processor, and an array of microphones coupled to the speech recognition processor. At 210, the depth sensor is operable to calculate a distance and a direction from the array of microphones to a source of audio data. At 215, the speech recognition processor is operable to select an acoustic model as a function of the distance and the direction from the array of microphones to the source of audio data. In selecting the acoustic model, one of skill in the art knows that important parameters in microphone characteristics are gain, phase, sensitivity, and spatial directivity pattern. In many applications, the microphone array characteristics are not exactly known and can even change over time. One of the important design considerations to ensure the best performance of an ASR system is the intended distance from the person speaking to the microphone, since sound pressure levels of speech at the microphone decrease as a function of the square of the distance between the source of the speech and the microphone. Depending on the type of microphone used and the placement relative to the person speaking, small changes in distance can have profound affects on performance. Thus, knowing the distance from the microphone to the speaker helps in adapting microphone characteristics so as to achieve best result from the ASR system. At 220, the speech recognition processor uses the distance measure to modify the shape of the microphone array beam from broader to narrow so as to boost portions of the signals originating from the source of audio data and to suppress portions of the signals resulting from noise. At 225, the speech recognition processor uses the distance measure to select the number of microphones in an array for the beam formation process, which assists in optimizing the overall computation time. Consequently, the beam forming algorithm of the microphone array is modified by giving it an additional feature of distance. For example, the beam should be broader when the person is closer to the microphone array and the beam should be narrower when the person is far away from the microphone array. As indicated at 230, if the system determines that the speaking person or source of audio data is at a relatively large distance from the microphone array, the system can accordingly increase the gain and/or sensitivity of one or more of the microphones in the array so as to better receive and process the audio data. Additionally, the distance to the speaker can be used to optimize the number of microphone elements to be used for the beam forming. For example, when the speaker is closer, a smaller number of microphones could be used in the array for beam forming, which would assist in achieving noise suppression with minimal computation.

In another embodiment, as illustrated in block 235, the system includes a face recognition processor. The face recognition processor is operable to identify a person, and to use the identified person to calculate the distance from the person to the array of microphones. The face recognition module can include face detection, alignment, and matching sub-modules. Once the 3D depth information of the scene is obtained, faces that are present in the scene are detected. In order to accomplish this, a face detection algorithm is executed on the entire scene (RGB pixel values). Alternatively, using 3D depth information, people can be separated from the background, and the face detection module is executed only on the detected foreground. Once the faces are detected, the face matching module aligns the faces to fixed templates, then extracts features from the faces and uses them to match similar features of the faces stored in the database. The face recognition module helps in identifying the correct person, so that only the distance from the identified person to the microphone array is used. The distance from the person to the array of microphones is used to select the acoustic model and use it in the microphone array beam formation. Additionally, in a single speaker application, processing the depth map from the 3D sensor helps to locate the speaker and thus help distinguish from noise. In a multi-speaker context, concepts such as face recognition can be used. It is a human tendency to look at the device that is being commanded while speaking. Therefore, face detection helps in determining one among multiple persons who is speaking. The system uses the distance from the person to the array of microphones to select the acoustic model and to use it in the microphone array beam formation. This feature can be particularly useful in a home control system, wherein the system can recognize the home owner as the person who should be recognized to receive commands from (such as "Lower the thermostat"), and not a guest of the homeowner. As illustrated at 237, the face recognition processor is operable to identify the person using a database of stored facial data.

As indicated at 240, the depth sensor can be a three-dimensional (3D) depth sensor. Additionally, as indicated at 242, the three-dimensional (3D) depth sensor can be a depth camera, and the depth camera can be an RGB camera. The depth camera is operable to receive image data and to generate a depth map from the image data, as illustrated in block 244. And at 246, the depth camera is operable to apply image segmentation to the image data to identify the source of the audio data and to determine the distance between the source of the audio data and the depth camera. This feature is most useful and effective when there is one person in the environment, and that one person can be segmented from a background of non-human objects.

At 250, the speech recognition processor is further operable to identify the audio data as a voice command and to execute a function in response to the voice command. For example, in a home control system, the system may be configured to recognize the voice command "Lock the front door" to secure the front door of a person's home.

At 255, the system can further include an output device that is coupled to the speech recognition processor. As indicated at 257, the speech recognition processor can be operable to provide feedback via the output device. The feedback can be based on the distance of a speaking person to the source of the audio data. For example, if after increasing the gain and sensitivity of one or more microphones, the system still cannot interpret a voice command, the system can instruct the speaking person to move closer to the microphones and/or to speak more loudly and/or more clearly.

As noted above, and as illustrated at 260, the depth sensor and the array of microphones can be part of a voice and motion controlled video game or a voice and motion controlled residence or business control system.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising:
   a speech recognition processor;
   an output device coupled to the speech recognition processor;
   a depth sensor coupled to the speech recognition processor; and
   an array of microphones coupled to the speech recognition processor;
   wherein the depth sensor is operable to calculate a distance and a direction from the array of microphones to a source of audio data;
   wherein the speech recognition processor is operable to select an acoustic model as a function of the distance and the direction from the array of microphones to the source of audio data, the acoustic model including one or more characteristics, the characteristics including a gain, a phase, a sensitivity, and a spatial diversity pattern;
   wherein the acoustic model comprises a distance-specific acoustic model, and wherein the distance-specific acoustic model applies a weighting factor to a signal received by different units of the array of microphones to suppress noise and boost a signal amplitude of a voice of a speaker;
   wherein the speech recognition processor is operable to use the direction to modify a shape of a beam of the microphone array from broader to narrower so as to boost signals generated from the source of audio data and to suppress signals generated from noise;
   wherein the speech recognition processor is operable to use the distance to modify a direction of the beam;
   wherein the speech recognition processor is operable to use the distance to select a number of microphones in an array for a beam formation process;
   wherein the depth sensor is operable to receive image data and to generate a depth map from the image data;
   wherein the depth sensor is operable to apply image segmentation to the image data to identify the source of the audio data and to determine a distance between the source of the audio data and the depth sensor; and
   wherein the speech recognition processor is operable to provide feedback via the output device, the feedback based on the distance from the array of microphones to the source of the audio data; the feedback including instructing the speaker to move a specific distance closer to the array of microphones, to speak more loudly, and to speak more clearly.

2. The system of claim 1, comprising a face recognition processor that is operable to identify a person as the source of audio data, to use the person to calculate the distance from the array of microphones to the source of audio data, and to use the distance from the array of microphones to the source of audio data to select the acoustic model and to use the distance in the beam formation process.

3. The system of claim 2, wherein the face recognition processor is operable to identify the person using a database of stored facial data.

4. The system of claim 1, wherein the acoustic model is operable to modify the one or more characteristics of the microphone array.

5. The system of claim 1, wherein the depth sensor comprises a three-dimensional (3D) depth sensor.

6. The system of claim 5, wherein the three-dimensional (3D) depth sensor comprises a depth camera.

7. The system of claim 6, wherein the depth camera comprises an RGB camera.

8. The system of claim 1, wherein the speech recognition processor is operable to identify the audio data as a voice command and to execute a function in response to the voice command.

9. The system of claim 1, wherein the speech recognition processor is operable to use the distance to select a number of microphone elements in an array for the beam formation process.

10. The system of claim 1, wherein the depth sensor and the array of microphones comprise a voice and motion controlled video game or a voice and motion controlled residence or business control system.

11. A process comprising:
    calculating using a computer processor a distance and a direction from an array of microphones to a source of audio data;
    selecting an acoustic model, using a speech recognition processor, as a function of the distance and the direction from the array of microphones to the source of audio data, wherein the acoustic model includes a gain, a phase, a sensitivity, and a spatial diversity pattern;
    applying the distance in a microphone array beam formation so as to modify the shape and direction of the beam to boost signals generated from the source of audio data and to suppress signals generated from noise;
    applying the distance to select a number of microphone elements in the array for the microphone array beam formation;

using a depth sensor to receive image data and to generate a depth map from the image data; and using the depth sensor to apply image segmentation to the image data to identify the source of the audio data and to determine a distance between the source of the audio data and the depth sensor;

wherein the acoustic model comprises a distance-specific acoustic model, and wherein the distance-specific acoustic model applies a weighting factor to a signal received by different units of the array of microphones to suppress noise and boost a signal amplitude of a voice of a speaker; and wherein the speech recognition processor is operable to provide feedback via an output device, the feedback based on the distance from the array of microphones to the source of the audio data; the feedback including instructing the speaker to move a specific distance closer to the array of microphones, to speak more loudly, and to speak more clearly.

12. The process of claim 11, further comprising identifying a person using the computer processor as the source of audio data, using the person to calculate the distance from the array of microphones to the source of audio data, and using the distance from the array of microphones to the source of audio data to select the acoustic model and using the acoustic model in the microphone array beam formation.

13. The process of claim 11, further comprising modifying using the computer processor one or more of a gain of the microphone, a phase of the microphone, a sensitivity of the microphone, and a spatial diversity pattern of the microphone.

14. The process of claim 11, further comprising identifying the audio data as a voice command and executing a function in response to the voice command.

15. The process of claim 11, further comprising providing using the computer processor feedback via an output device, the feedback based on the distance from the array of microphones to the source of the audio data.

16. A computer processor for executing a process comprising:

calculating a distance and a direction from an array of microphones to a source of audio data;

selecting an acoustic model, using a speech recognition processor, as a function of the distance and the direction from the array of microphones to the source of audio data, wherein the acoustic model includes a gain, a phase, a sensitivity, and a spatial diversity pattern;

applying the distance in a microphone array beam formation so as to modify the shape and direction of the beam to boost portions of signals generated from the source of audio data and to suppress signals generated from noise;

applying the distance measure to select a number of microphone elements in the array for the microphone array beam formation;

using depth sensor to receive image data and to generate a depth map from the image data; and using the depth sensor to apply image segmentation to the image data to identify the source of the audio data and to determine a distance between the source of the audio data and the depth sensor;

wherein the acoustic model comprises a distance-specific acoustic model, and wherein the distance-specific acoustic model applies a weighting factor to a signal received by different units of the array of microphones to suppress noise and boost a signal amplitude of a voice of a speaker; and wherein the speech recognition processor is operable to provide feedback via an output device, the feedback based on the distance from the array of microphones to the source of the audio data; the feedback including instructing the speaker to move a specific distance closer to the array of microphones, to speak more loudly, and to speak more clearly.

* * * * *